Patented Jan. 5, 1937

UNITED STATES PATENT OFFICE 2,066,329

CHEMICAL PRODUCTS AND PROCESSES FOR PRODUCING SAME

Wallace H. Carothers, Arnold M. Collins, and James E. Kirby, Wilmington, Del., assignors to E. I. du Pont de Nemours & Company, Wilmington, Del., a corporation of Delaware No Drawing. Application February 6, 1935, Serial No. 5,246

25 Claims. (Cl. 260—2)

This invention relates to a process of polymerizing chloro-2-butadiene-1,3. More particularly it relates to the polymerization of chloro-2-butadiene-1,3 in the presence of other polymerizable materials. Still more particularly it relates to the polymerization of chloro-2-butadiene-1,3 in the presence of other butadienes.

This application is a continuation in part of a copending application, Serial No. 665,554, filed April 11, 1933 and of an application Serial No. 519,242, filed February 28, 1931, and now matured into Patent #1,967,860.

It is an object of this invention to produce new polymers of chloro-2-butadiene-1,3. It is a further object of the invention to produce new polymers of chloro-2-butadiene-1,3 by polymerizing chloro-2-butadiene-1,3 in the presence of other butadienes. It is a still further object of the invention to carry out the polymerization of chloro-2-butadiene-1,3 in the presence of other butadienes in various media. A still further object of the invention is to provide a means for imparting to the polymers of chloro-2-butadienes-1,3 some of the properties of the polymers of other butadienes. Other objects will appear hereinafter.

These objects are accomplished by the following invention in which chloro-2-butadiene-1,3 is polymerized in the presence of other butadienes. This polymerization is brought about both in the presence and absence of other solvents or diluents, as well as in aqueous dispersions of the two materials which may or may not contain, in addition to these materials, modifying ingredients. The proportions of the two materials used vary widely as do the properties of the products.

The invention is more fully illustrated by the following examples. These examples, however, are intended to be illustrative only and are not to be construed as limiting the scope of the invention.

Example 1

A solution of 20 grams of dimethyl-2,3-butadiene-1,3 in 80 grams of chloro-2-butadiene-1,3 was placed in a bottle of ordinary soft glass and exposed to the light from a Cooper-Hewitt lamp for 72 hours at about 27° C. The resulting viscous sirup was poured into alcohol and the precipitated plastic mass thoroughly washed with alcohol and dried by milling on cold rolls. The plastic mass was compounded according to the following formula and cured in a mold at 125° C. for 25 minutes.

| | Parts |
|---|---|
| Polymer | 100 |
| Phenyl-$\beta$-naphthylamine | 1.5 |
| Zinc oxide | 10.0 |
| Benzidine | 1.0 |
| Stearic acid | 1.0 |

The cured polymer remained pliable for more than five weeks at 10° C.

Example 2

One volume of chloro-2-butadiene-1,3 and one volume of isoprene are mixed and sealed in a vessel containing two volumes of air. The mixture is allowed to stand for three months and then is opened. The product is a colorless, transparent, strong, very extensible, elastic mass. It still contains some unchanged isoprene which gradually evaporates when a sample is freely exposed to the air.

In the following examples the use of other butadienes in the preparation of synthetic latices from chloro-2-butadiene-1,3 is illustrated.

Example 3

A solution of 10 grams of dimethyl-2,3-butadiene-1,3 in 90 grams of chloro-2-butadiene-1,3 was emulsified in 100 grams of 2% sodium oleate solution. The emulsion was stored at 25° C. for 45 hours, after which it was found to be substantially completely polymerized to the elastic stage. Phenyl-$\beta$-naphthylamine (1.5% on the polymer content) was then added in the form of an aqueous dispersion to act as an anti-oxidant for the polymers. A film was flowed on a porous plate. After most of the water had soaked into the plate there remained a film of rubber-like polymer. The drying was completed by heating the film at 80° C. for 48 hours. The finished product was a film resembling soft vulcanized rubber. This film had a tensile strength of 1100 lbs./in.$^2$ and an elongation of 1300%. It remained pliable during prolonged storage at 10° C.

Example 4

A solution of 1 gram of heptyl-2-butadiene-1,3 ($CH_2=C(C_7H_{15})-CH=CH_2$) in 9 grams of chloro-2-butadiene-1,3 was emulsified in 10 grams of 2% sodium oleate solution. The emulsion was substantially completely polymerized to the elastic stage, stabilized and a film prepared as in Example 3. This product was fairly strong and elastic and resembled soft vulcanized rubber. It had better tear resistance and pliability than films from emulsions of chlorobutadiene.

Example 5

A solution of 1 gram of bromo-2-butadiene-1,3 in 99 grams of chloro-2-butadiene-1,3 was emulsified in 100 grams of 2% sodium oleate solution and the emulsion stored in an ice bath. After 5 hours, 34.4% of the mixture of dienes had polymerized. The emulsion was transferred to a refrigerator at 10° C. and stored for an additional period of 43 hours. The emulsion, now completely polymerized, was stabilized as in the above examples and films prepared in the same manner.

These rubber-like films had a tensile strength of 2100 lbs./in.² and better tear resistance than films from emulsions of chlorobutadiene alone.

*Example 6*

An emulsion was prepared which was similar in every way to that of Example 5, except that 10 grams of bromo-2-butadiene-1,3 and 90 grams of chloro-2-butadiene-1,3 were used. The emulsion polymerized much more rapidly (51.25% in 5 hours) but the product was very similar.

*Example 7*

Thirty parts of butadiene are dissolved in 70 parts of chloroprene contained in a thoroughly cooled vessel, and the resulting mixture is slowly added to 100 parts of water containing two parts of sodium oleate, the solution being vigorously stirred with a mechanical stirrer during the addition and the temperature being maintained between 0° and 5° C. In this manner a smooth homogeneous milk-like dispersion is obtained. It is placed in a closed vessel and allowed to stand at a temperature between 10° and 20° C. for 1-2 weeks. During this period of time the mixture of dienes is largely polymerized. The resulting latex can be coagulated by the addition of acid. The coagulum of synthetic rubber is much softer and more plastic and pliable than products similarly prepared from chloro-2-butadiene-1,3 alone. On the other hand, in its elastic properties and strength it is superior to products ordinarily obtained from butadiene alone. In carrying out the preparation of a mixed polymer by this method the rate of polymerization is considerably slower than that obtained when using chloro-2-butadiene-1,3 alone. It may, therefore, be desirable to accelerate the reaction either by the addition of such catalysts as hydrogen peroxide or other peroxides, or by the use of a somewhat higher temperature. The synthetic latex of this process may be stabilized by the addition of ammonia and antioxidants in the usual manner, and it may then be used for the preparation of shaped articles by dipping or for the coating of fabrics such as cloth. The coagulated polymer also may be mixed with the usual types of rubber compounding ingredients and converted into a less plastic and more definitely vulcanized form by heating at elevated temperatures, for example, 125° C.

It will be observed that in Examples 3 and 4 the chlorobutadiene polymerized completely to an elastic polymer and rubber articles prepared from these synthetic latices, like those from chlorobutadiene alone, required no vulcanization and the modified rubber retained the desirable properties previously set forth. These latices are admirably suited to the preparation of coated and impregnated cloth and paper because of the softness and pliability of the synthetic rubber. Although we do not wish to be limited to theory, we attribute the improvement in pliability in the processes of the above examples to an actual chemical intercombination of chlorobutadiene with the added substance, resulting in a chemically and physically different molecule.

In general the process of the present invention comprises the polymerization of chloro-2-butadiene-1,3 in the presence of a wide variety of butadienes under rather widely varying conditions. Each of these materials in the presence of which chloro-2-butadiene-1,3 is to be polymerized will, as the name "butadiene", implies, be found to contain the following nucleus in an open chain:

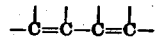

The compounds included by this group will, therefore, vary from butadiene, the simplest member, through a great number of substituted butadienes containing a diversity of substituents. Other examples of such butadienes are bromo-2-butadiene-1,3 and chloro-1-butadiene-1,3 as well as those described in the following United States patents and applications: United States Patent No. 1,950,440; United States Patent No. 1,950,441; and United States Patent No. 1,963,108, also an application of Carothers, Serial No. 583,391, filed December 26, 1931, and an application of Carothers and Berchet, Serial No. 640,326, filed October 29, 1932.

It has been found that particularly desirable products are obtained by polymerizing chloro-2-butadiene-1,3 in the presence of lower members of the various series of butadienes mentioned, as for example, dimethyl-2,3-butadiene-1,3, bromo-2-butadiene-1,3, heptyl-2-butadiene-1,3, ethyl-2-butadiene-1,3, methyl-1-butadiene-1,3, 2,3-diethyl-butadiene-1,3, octadiene-3,5 cyclo-pentadiene, the isomer of cyclo-hexadiene containing conjugate unsaturation and dimethyl-1,1-butadiene-1,3. The preferred procedure, however, involves the polymerization chloro-2-butadiene-1,3 in the presence of other 2-substituted butadienes and, in particular, 2-substituted butadienes-1,3 of the general formula $$CH_2=CY-CH=CH_2,$$

where Y may, for example, be alkyl, aryl, aralkyl, alkoxy, bromine, iodine, etc. Particular examples of such butadienes, in addition to those already mentioned, include phenyl-2-butadiene-1,3, methoxy-2-butadiene-1,3, ethoxy-2-butadiene-1,3 and butoxy-2-butadiene-1,3.

It has been stated that an object of this invention is to provide a means for imparting to chlorobutadiene polymers some of the properties of other butadiene polymers. It will be obvious that a further object is to confer on other butadiene polymers the properties of chlorobutadiene polymer. We are, therefore, not limited to the proportions set forth in the examples and the amount of chlorobutadiene in the unpolymerized mixture or the chlorobutadiene polymer in the polymerized mixture may vary from 1% to 99% of the total. Thus, it is possible, according to the present invention, to prepare products having preselected properties by choosing the proper proportion of constituents.

It is not possible to draw any exact generalizations concerning the properties of these products but it may be said that when polymerized chloro-2-butadiene-1,3 preponderates (50% or more) the products are usually rubber-like, but if the added ingredients are present in large amounts the product will resemble the polymers of those ingredients, except that it has a toughness and elasticity similar to that of polymerized chloro-2-butadiene-1,3. It is, therefore, apparent that the particular proportions to be used will in each case depend upon the properties which are desired in the final product.

Although the proportions of the various constituents exhibit a marked influence on the final product they do not completely determine its properties which are dependent as well on the conditions of the polymerization. Two general methods of polymerization, namely, in bulk and in emulsion are illustrated by the examples and to these may be added a third, namely, polymerization in the presence of a solvent for the chloro-2-butadiene-1,3 and the other butadiene. As might be expected, in general, the polymerization takes place in emulsion at a more rapid rate and in solution at a less rapid rate than when the polymerization is carried out in the absence of a diluent or a solvent as is the case with chloro-2-butadiene when it is polymerized alone. The rate of polymerization is increased by catalysts, such as benzoyl peroxide, and is decreased by inhibitors, such as phenylbetanaphthylamine. The rate of polymerization is favorably affected by ordinary light and to an even greater extent by ultraviolet light. Higher temperatures and pressures, likewise, favor higher rates of polymerization. Temperatures in the range of 0 to 30° C. are mentioned in the examples and, although, these are preferred the invention is not so limited. Useful products may be obtained when using higher or lower temperatures. These temperatures are, however, preferred only for the first polymerization step. The curing of the compounded polymer preferably takes place at about 125° C., although variations from this temperature also are permissible.

Although only alkaline dispersions are illustrated by the examples the broad invention is not so limited. Acid dispersions are also contemplated. The dispersions may be modified by the addition of suitable solvents, both high and low boiling, acid acceptors such as proteins, catalysts, inhibitors, etc.

Time is an important factor in both the first polymerization step and the curing. The examples indicate that the time of exposure to the polymerizing influence is by no means fixed, although the time of exposure does, to a large extent, determine the properties of the final product. No exact times can be given, however, in view of the fact that the stage of polymerization reached in a given time depends also to a large extent on other factors discussed herein. The time required to produce a given product can, of course, be determined by polymerizing a test sample under selected conditions and observing the nature of the product at frequent intervals as will be obvious to one skilled in the art.

Various materials other than the butadienes may be present during the polymerization as has been partly pointed out hereinbefore. Other modifications include polymerization in dispersion media other than water, in solvents for the two monomers which are not solvents for the polymerized product, in the presence of other film-forming materials or paint or varnish adjuncts as for example, natural or synthetic resins, cellulose derivatives, drying oils, etc.

While the rate of polymerization appears to be favorably affected by the presence of oxygen, polymerization may be carried out in the substantial absence of oxygen. Interesting variations in the final product may in this way be produced.

In the preparation of emulsions as described above, the invention is not limited to the emulsifying agent already mentioned nor to the quantities employed in the example. Any emulsification agent appears to function satisfactorily when used in sufficient quantity. In addition to those already named, the fat alcohol sulfates or sulfonates or their derivatives or the alkyl naphthalene sulfonic acids as well as the quaternary ammonium salts, containing long chain saturated hydrocarbon radicals and related compounds will be found to function satisfactorily. The quantity of each to be used may, in general, be determined from their known effectiveness in other similar uses.

While still operating within the scope of the present invention, it should be apparent, from the description, that it is possible to prepare final products differing widely in properties. The wide difference makes it difficult to generalize but among others it is possible to produce products varying from viscous liquids, through plastic masses to tough elastic or brittle masses. Preferably, however, the invention is carried out, as illustrated in the examples, by continuing the polymerization only to the plastic stage and then separating the plastic mass from the unpolymerized material or any other undesired material and thereafter either with or without the addition of compounding ingredients, carrying the polymerization on to the desired final stage, usually an elastic product. It has been possible to show in some cases, actual inter-polymerization but the invention is not limited to such a result.

The above remarks apply where the product is to be used in the massive form. The mass may, however, be dissolved in a suitable solvent, or the solution or dispersion resulting from carrying out the polymerization in emulsion or solution may be employed in a variety of ways, for example, as rubber substitutes for the preparation of dipped, coated, extruded or impregnated articles or films may be cast from the liquid composition.

The polymer product may also be given further treatment to produce other products, also useful in a variety of ways. By way of example, the polymers may be halogenated or may be reacted with a hydrohalogen under a variety of conditions, i. e., in solution, in the gaseous state or in the liquid state.

Certain of the polymers are characterized by excellent softness and pliability and are therefore eminently suited to particular uses. For example, they may be calendered on to cloth for the preparation of coated fabrics of excellent quality, since they retain the properties of long life and resistance to various solvents and reagents which are characteristic of polymers of pure chloro-2-butadiene-1,3. Solutions of the uncured polymers in benzene, toluene or other suitable solvents may be used for coating and impregnating by any of the numerous processes set forth in the copending application of Collins and Larson, Serial No. 572,727, filed November 2, 1931. Further, the polymers may be compounded with re-enforcing agents, such as carbon black, to produce further useful products.

The invention has been described with particular reference to chloro-2-butadiene-1,3 but it should be apparent that the remarks already made with regard to the chloro compound apply, in general, to other halogen-2-butadienes-1,3, for example, bromo-2-butadiene-1,3. Thus, the latter compound may also be polymerized in the presence of a wide variety of other butadienes to yield products comparable with those obtained when using the chloro derivative.

It is desired to point out that wherever in the claims the term "compound containing the nucleus

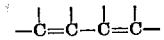

in an open chain" is used it is intended to include, as obvious equivalents, closed chain compounds of the type of cyclo-penta-diene. In reality the term "in an open-chain" is used only to distinguish the compounds to which the present invention relates from aromatic compounds which do contain the same nucleus. The real distinction is between aliphatic and aromatic compounds. Compounds of the type of cyclo-penta-diene, to which the broad term "alicyclic" is applied are classified with aliphatic compounds in the art and are not intended to be excluded by the terms of the claims of this application.

In applying the products of this invention it is often desirable to admix them with pigments, dyes, antioxidants, or other modifying agents, and the use of such ingredients will be obvious to those skilled in the art relating to rubber, resins, gums, drying oils, etc.

It is apparent that many widely different embodiments of this invention may be made without departing from the spirit and scope thereof and therefore it is not intended to be limited except as indicated in the appended claims.

We claim:

1. A polymer of chloro-2-butadiene-1,3 obtainable by polymerizing chloro-2-butadiene-1,3 in the presence of a second compound containing the nucleus

in an open chain.

2. An elastic polymer of chloro-2-butadiene-1,3 obtainable by polymerizing chloro-2-butadiene-1,3 in the presence of a second compound containing the nucleus

in an open chain.

3. A plastic polymer of chloro-2-butadiene-1,3 obtainable by polymerizing chloro-2-butadiene-1,3 in the presence of a second compound containing the nucleus

in an open chain.

4. A product obtainable by partially polymerizing chloro-2-butadiene-1,3 in the presence of a second compound containing the nucleus

in an open chain, then separating a plastic mass from the unpolymerized material and thereafter heating the plastic mass at about 125° C. until cured.

5. The process which comprises polymerizing chloro-2-butadiene-1,3 in the presence of a second compound containing the nucleus

in an open chain.

6. The process which comprises completely polymerizing chloro-2-butadiene-1,3 in the presence of a second compound containing the nucleus

in an open chain.

7. The process which comprises partially polymerizing chloro-2-butadiene-1,3 in the presence of a second compound containing the nucleus

in an open chain and then separating a plastic mass from the unpolymerized material.

8. The process which comprises partially polymerizing chloro-2-butadiene-1,3 in the presence of a second compound containing the nucleus

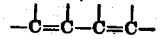

in an open chain, then separating a plastic mass from the unpolymerized material and thereafter heating the plastic mass at about 125° C. until cured.

9. The process which comprises dispersing, in water, chloro-2-butadiene-1,3 and a second compound containing the nucleus

in an open chain and thereafter polymerizing the chloro-2-butadiene-1,3 in the dispersed state.

10. The process which comprises polymerizing chloro-2-butadiene-1,3 in the presence of a second compound containing the nucleus

in an open chain and in the presence of a solvent for the two materials.

11. The process which comprises dispersing, in water, chloro-2-butadiene-1,3 and a second compound containing the nucleus

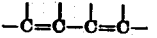

in an open chain, then polymerizing the chloro-2-butadiene-1,3 in the dispersed state and thereafter separating the polymer from the dispersing medium.

12. The process which comprises polymerizing chloro-2-butadiene-1,3 in the presence of a second compound containing the nucleus

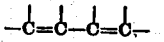

in an open chain, in the presence of a solvent for the two materials and then separating the polymer from the solvent.

13. A polymer of a halogen-2-butadiene-1,3, obtainable by polymerizing a halogen-2-butadiene-1,3 in the presence of a second compound containing the nucleus

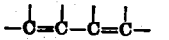

in an open chain.

14. The process which comprises polymerizing a halogen-2-butadiene-1,3 in the presence of a second compound containing the nucleus

in an open chain.

15. A polymer of a halogen-2-butadiene-1,3, obtainable by polymerizing a halogen-2-butadiene-1,3 in the presence of a second 2-substituted butadiene-1,3.

16. A polymer of chloro-2-butadiene-1,3, obtainable by polymerizing chloro-2-butadiene-1,3 in the presence of a second 2-substituted butadiene-1,3.

17. A polymer of chloro-2-butadiene-1,3, obtainable by polymerizing chloro-2-butadiene-1,3 in the presence of butadiene-1,3.

18. A polymer of chloro-2-butadiene-1,3, obtainable by polymerizing chloro-2-butadiene-1,3 in the presence of dimethyl-2,3-butadiene-1,3.

19. A polymer of chloro-2-butadiene-1,3 obtainable by polymerizing chloro-2-butadiene-1,3 in the presence of methyl-2-butadiene-1,3.

20. The process which comprises polymerizing chloro-2-butadiene-1,3 in the presence of dimethyl-2,3-butadiene-1,3 and in the presence of a polymerization catalyst at about room temperature.

21. The process which comprises dispersing chloro-2-butadiene-1,3 and butadiene in an aqueous solution containing an emulsifying agent and polymerizing the chloro-2-butadiene-1,3 in the emulsified state at about room temperature.

22. The process which comprises polymerizing chloro-2-butadiene-1,3 in the presence of methyl-2-butadiene-1,3 and in the presence of a polymerization catalyst at about room temperature.

23. A polymer of chloro-2-butadiene-1,3 obtainable by polymerizing chloro-2-butadiene-1,3 in the presence of a second compound of the general formula $CH_2=CY-CH=CH_2$, in which Y is a radical selected from the group consisting of alkyl, aryl, arylalkyl, alkoxy, bromine and iodine radicals.

24. A polymer as described in claim 23, further characterized in that Y in the general formula is a low molecular weight radical.

25. A dispersion obtainable by dispersing, in water, chloro-2-butadiene-1,3 and a second compound containing the nucleus $$-\overset{|}{C}=\overset{|}{C}-\overset{|}{C}=\overset{|}{C}-$$

in an open chain and thereafter polymerizing the chloro-2-butadiene-1,3 in the dispersed state.

WALLACE H. CAROTHERS.
ARNOLD M. COLLINS.
JAMES E. KIRBY.